(12) United States Patent
Morimura et al.

(10) Patent No.: US 10,016,681 B2
(45) Date of Patent: Jul. 10, 2018

(54) NON-TRANSITORY COMPUTER-READABLE STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Naoya Morimura, Kyoto (JP); Hidekazu Ota, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 410 days.

(21) Appl. No.: 14/718,872

(22) Filed: May 21, 2015

(65) Prior Publication Data

US 2015/0367236 A1    Dec. 24, 2015

(30) Foreign Application Priority Data

Jun. 24, 2014    (JP) .................................. 2014-129465

(51) Int. Cl.
*A63F 13/00*    (2014.01)
*A63F 13/53*    (2014.01)

(52) U.S. Cl.
CPC .................................. *A63F 13/53* (2014.09)

(58) Field of Classification Search
USPC .................................................... 463/16–43
See application file for complete search history.

(56) References Cited

U.S. PATENT DOCUMENTS

| 9,730,025 | B2* | 8/2017 | Yuen .................... A61B 5/0002 |
| 2009/0186328 | A1* | 7/2009 | Robinson ................ G09B 5/14 434/350 |
| 2009/0235194 | A1 | 9/2009 | Arndt et al. |
| 2011/0230257 | A1* | 9/2011 | LeBaron ................. G07F 17/32 463/25 |
| 2012/0290109 | A1* | 11/2012 | Engelberg ........... G06F 19/3481 700/91 |
| 2014/0288435 | A1* | 9/2014 | Richards ............ A61B 5/02427 600/479 |

FOREIGN PATENT DOCUMENTS

| JP | 2005-317202 | 11/2005 |
| JP | 2014-75119 A | 4/2014 |

* cited by examiner

*Primary Examiner* — Masud Ahmed
(74) *Attorney, Agent, or Firm* — Nixon & Vanderhye, P.C.

(57) ABSTRACT

An example progress indicator indicating the progress of a task including a series of multiple steps is to be displayed. The progress indicator includes an overall progress display area for indicating the progress of a task overall, and an individual progress display area for indicating the progress of each individual step included in the task. The individual progress display area is displayed inside the overall progress display area.

14 Claims, 11 Drawing Sheets

F I G. 2
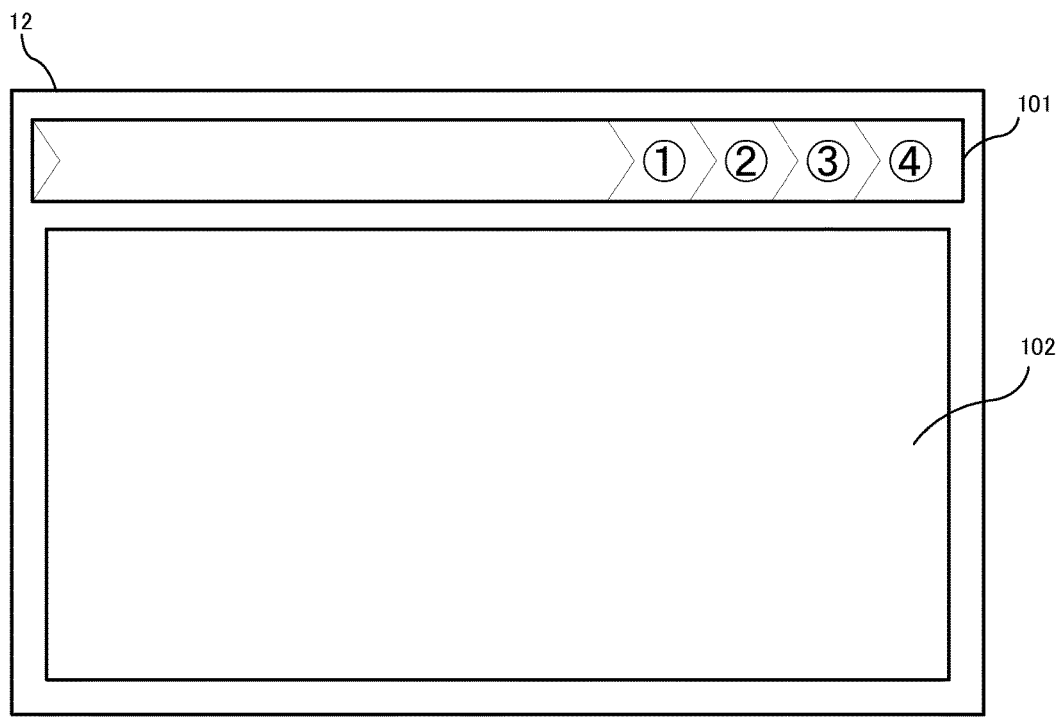

NON-TRANSITORY COMPUTER-READABLE STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2014-129465, filed on Jun. 24, 2014, is incorporated herein by reference.

FIELD

The exemplary embodiments described herein relate to information processing for indicating a progress status, and, more specifically, relate to an information processing apparatus or the like configured to execute information processing for indicating a progress status of a task that is a process completed through a series of multiple steps.

BACKGROUND AND SUMMARY

A technology of displaying, as an action status of a copying action on a monitor, overall progress information and a progress status for each data is hitherto known.

With such a technology, a progress status of each data that is being copied to a hard disk drive is displayed on a monitor at a display part for optical discs, and the overall progress status is displayed on the monitor at a display part for hard disks. With this, while copying, it is possible to visually confirm how far copying of data has been completed at present, which data is currently being copied, and how much uncopied data is remaining, immediately.

However, in the technology described above, the overall progress status and the progress status (individual progress status) of each data that is being copied have been each displayed in separate areas within a screen.

Thus, an object of the present embodiment is to provide a non-transitory computer-readable storage medium having stored thereon an information processing program enabling saving space for a progress display, an information processing apparatus, an information processing system, and an information processing method.

In order to achieve the above described object, for example, the following configuration examples are exemplified.

A configuration example is a non-transitory computer-readable storage medium having store thereon an information processing program to be executed by a computer of an information processing apparatus configured to indicate a progress status of a task including a series of multiple steps. The non-transitory computer-readable storage medium causes the computer to function as progress display means configured to display, at a predetermined display part, a progress indicator indicating the progress status of the task. The progress indicator includes an overall progress display area configured to indicate a progress of the task overall, and an individual progress display area configured to indicate a progress of the multiple steps themselves included in the task. In addition, the individual progress display area is displayed within the overall progress display area.

With the above described configuration example, the progress of the task overall and the progress of each individual step can be displayed in a space-saving manner.

In another configuration example, the progress display means may be configured to display a progress status using one that is a gauge type which lengthens depending on the progress.

With the above described configuration example, the progress status can be presented to a user in an intuitive and easily understandable manner.

In still another configuration example, the progress display means may be configured to indicate, in an identifiable manner on the overall progress display area, which step is being processed among the steps included in the task, and indicate, in an identifiable manner on the individual progress display area, which sub-step is being processed among multiple sub-steps included in the step that is being processed.

With the above described configuration example, the current progress status can be presented to the user in a more easily understandable manner.

In still another configuration example, the progress display means may be configured to display the overall progress display area such that the overall progress display area is divided for each of the multiple steps included in the task. Furthermore, the individual progress display area may be displayed inside an area related to a step that is being processed within the divided overall progress display area.

With the above described configuration example, it is possible to present to the user, which step is a step that is being processed and an individual progress thereof, in an easily understandable manner.

In still another configuration example, the progress display means may be configured to display, within the divided overall progress display area, an area related to a step that is being processed such that at least one of shape, size, and color of the area is different from an area related to other steps. Furthermore, an overall progress display area related to a step that is being processed may be transformed and displayed so as to be lengthened or expanded, and the overall progress display area may be transformed and displayed so as to be shortened or contracted when the step ends. Furthermore, the individual progress display area may be displayed inside the lengthened overall progress display area.

With the above described configuration example, it becomes possible to display a step that is currently being processed in a highlighted manner, and easily notify the user about the progress status in an intuitive manner.

In still another configuration example, the progress display means may be configured to indicate, in the overall progress display area, a total number of steps included in the task.

With the above described configuration example, since the total number of steps is indicated, the progress status can be presented in a more understandable manner.

In still another configuration example, the progress display means may be configured to display, in a distinguishable manner, an overall display area related to a processed step and an overall display area related to an unprocessed step.

With the above described configuration example, it is possible to present how far the overall steps have been processed to the user in an easily understandable manner.

In still another configuration example, the progress display means may be configured to change a display position of the individual progress display area within the progress indicator depending on which step is being executed among the multiple steps included in the task.

With the above described configuration example, the progress status can be presented in an easily understandable manner.

The information processing program described above may be stored in any type of computer-readable storage medium (e.g., a flexible disk, a hard disk, an optical disc, a magneto-optical disc, a CD-ROM, a CD-R, a magnetic tape, a semiconductor memory card, a ROM, and a RAM, etc.).

With the present embodiment, an overall progress status of a task including multiple steps, and individual progress status of each of the steps can be displayed in a space-saving manner.

BRIEF DESCRIPTION OF THE DRAWINGS

FIG. 2 is a non-limiting example of a screen involved in a process of the present embodiment;

DETAILED DESCRIPTION OF NON-LIMITING EXAMPLE EMBODIMENTS

In the following, description of a non-limiting example embodiment will be provided. In the present embodiment, as a non-limiting example of an information processing apparatus, a stationary game system (hereinafter, simply referred to as a game system) is used as an example in the description.

Figure 1:
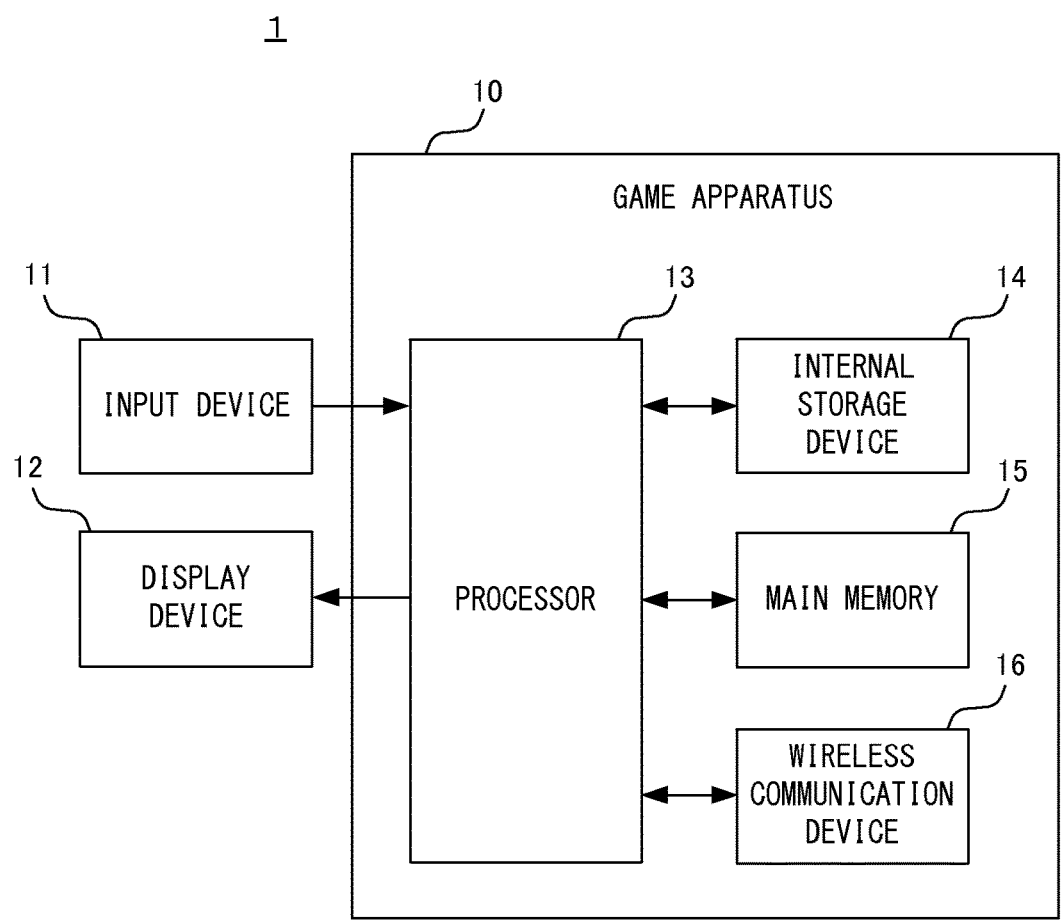
FIG. 1 is a block diagram showing a non-limiting example of a configuration of a game system 1.

In FIG. 1, a game system 1 includes a game apparatus 10, an input device 11, a display device 12, a processor 13, an internal storage device 14, a main memory 15, and a wireless communication device 16.

The input device 11 is operated by a user of the game apparatus 10, and is configured to output signals in accordance with an operation of the user. The input device 11 is, for example, a wireless controller. The display device 12 is configured to display images generated by the game apparatus 10 on a screen. The display device 12 is, for example, a television. The internal storage device 14 has stored thereon a computer program that is to be executed by the processor 13. Representatively, the internal storage device 14 is a flash EEPROM. The main memory 15 is configured to temporarily store a computer program and information. For example, the main memory 15 has stored thereon a program for executing a later described data transfer process, and various data used for the process. The wireless communication device 16 is configured to transmit signals to other game apparatuses and receive signals from other game apparatuses through wireless communication.

In the following, a general outline of the action of information processing according to the present embodiment will be described. In the present embodiment, information processing for displaying a progress status (degree of progress) of a series of processes including multiple steps as shown in the following is executed.

First, it is assumed that there is a process completed through a series of multiple process steps (execution of a plurality of predetermined information processes; also sometimes referred to as procedures). In the following, this process is referred to as a task. Multiple steps included in the task are each referred to as a "main step." In the present embodiment, as one example, it is assumed that the task includes four main steps. Although a specific example will be described later, the process of the present embodiment will be described using, as one example, a data transfer process between game apparatuses. Furthermore, as examples of the four main steps, a step of "preparing," a step of "presenting a description regarding a transfer process to a user," a step of "exporting data (from a transfer source)," and a step of "importing data (into a transfer destination)" are described as examples in the present embodiment.

Furthermore, each of the main steps includes multiple steps. In the following, such a step is referred to as a "sub-step." Although detailed description will be provided later, the number of sub-steps may vary.

The process according to the present embodiment is a process of displaying the progress of such a task. Specifically, a progress status of the task is indicated using a progress indicator 101 as shown in FIG. 2. FIG. 2 shows one example of a screen on which the progress indicator 101 is used. In FIG. 2, the progress indicator 101 is shown at the top end of the screen. Furthermore, provided below that is a main process display area 102. In this area, various displays are produced based on information processing according to the sub-steps described above. In the present embodiment, two types of progress statuses of an overall progress (indicating which main step is being processed) of the above described task and a progress related to the main step that is being executed (indicating, among the sub-steps included in the main step that is being executed, which sub-step is being processed and how far the main step has been processed) are displayed in a space-saving manner using the (single) progress indicator 101.

In another embodiment, a screen configuration in which the progress indicator 101 is displayed at the bottom end of the screen may be used.

Figure 3:
FIG. 3 is a non-limiting example displaying a progress indicator.

In the following, one example of a specific display mode using the progress indicator 101 will be shown using FIGS. 3 to 13. FIG. 3 shows an initial display state (a state immediately after when the process related to the task has started) of the progress indicator 101. In FIG. 3, a main step display area 103 is displayed at the right end side of the progress indicator 101. Since the present embodiment is an example having four main steps as described above, four main step display areas 103A to 103D are displayed. On each of the main step display areas 103A to 103D, a numerical value indicating an execution order of steps is also shown for enabling understanding of the total number of the main steps (number of overall steps of the task). In addition, a predetermined initial display text that is displayed at the start of the task is displayed at an area at the left side of the main step display area 103. Here, the name of the task such as, for example, "data transfer process" or the like is displayed.

Figure 4:
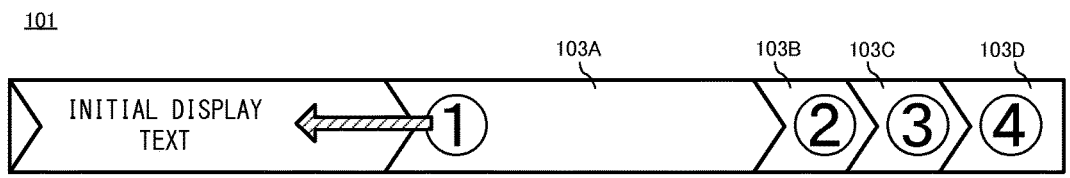
FIG. 4 is a non-limiting example displaying the progress indicator.
Figure 5:
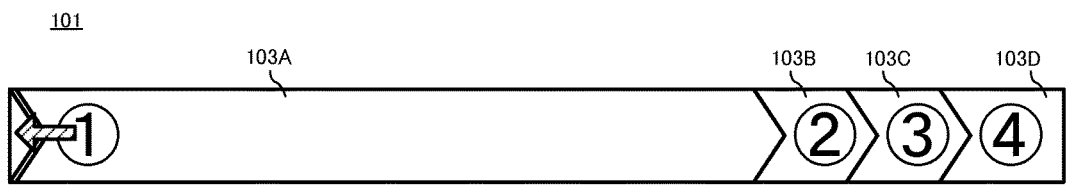
FIG. 5 is a non-limiting example displaying the progress indicator.

From this state, the first main step is initiated based on a predetermined operation by the user. Associated with the execution start of the first main step, the width of the first main step display area 103A is transformed so as to be larger. Specifically, as shown in FIGS. 4 and 5, the first main step display area 103A is transformed by displaying an animation in which the left end portion of the first main step display area 103A (also including a part with the numeral) is moved (stretched) toward the left end of the progress indicator 101. Associated with this, the initial display text is overwritten by the first main step display area 103A and erased.

Figure 6:
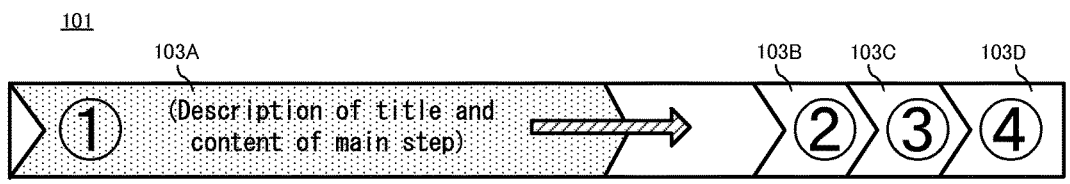
FIG. 6 is a non-limiting example displaying the progress indicator.
Figure 7:
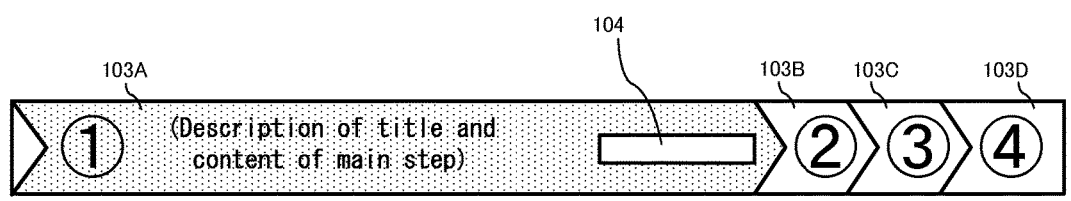
FIG. 7 is a non-limiting example displaying the progress indicator.
Figure 8:
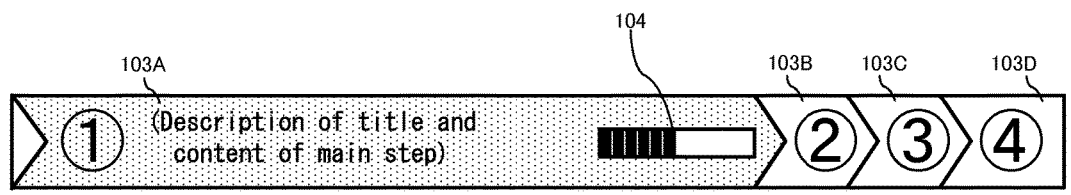
FIG. 8 is a non-limiting example displaying the progress indicator.
Figure 9:
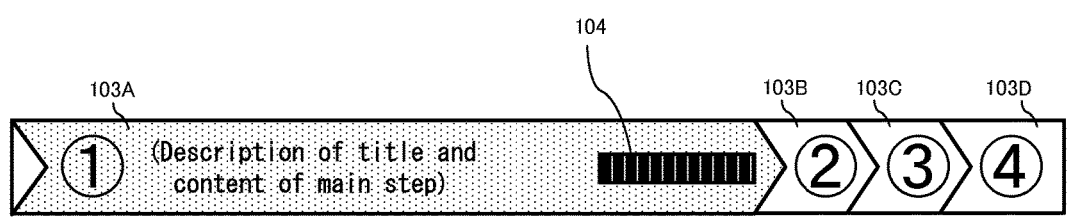
FIG. 9 is a non-limiting example displaying the progress indicator.

When the left end portion of the first main step display area 103A reaches the left end of the progress indicator 101, a band in a different color stretches from the left end of the progress indicator 101 in the right direction as shown in FIG. 6. Then, when the different color reaches a position of the left end of the second main step display area 103B (right end of the first main step display area 103A), the stretching stops. As a result, a display state as shown in FIG. 7 is obtained. In FIG. 7, the width of the first main step display area 103A has become larger (transformed). As a result, the display position of the first main step display area 103A has also been changed from that in FIG. 3 (at least, the display position of the left end is different). As a result, a state in which the first main step display area 103A is occupying equal to or more than half of the progress indicator 101 is obtained. At the right end portion of the first main step display area 103A, a sub-step progress gauge 104 for indicating a progress status of a sub-step is displayed. As the process of the multiple sub-steps included in the first main step progresses, the sub-step progress gauge 104 is displayed so as to stretch from the left end in the right direction as shown in FIGS. 8 and 9. The sub-step progress gauge 104 reaching the right end means that the first main step has ended. Thus, this state is a state simultaneously indicating, as the progress of the overall task, a process related to the first main step is in progress, and the progress of a process related to the first main step itself using the sub-step progress gauge 104. In an area inside the first main step display area 103A other than the portion for the sub-step progress gauge 104, a character string showing the title of the main step and process content thereof may be displayed as appropriate.

Regarding the change of display configuration, in another embodiment, the display configuration may be changed in any way as long as it is a display configuration in which the main step that is being processed is identifiably displayed and in which the progress of the sub-step is displayed. Examples thereof include displaying a display area of a main step that is being processed to be relatively larger than a display area of other main steps, and displaying a display area of a main step that is being processed to be in a color different from that of a display area of other main steps.

When the first main step ends, a second main step is initiated based on a predetermined operation by the user. The total number of sub-steps included in the second main step varies depending on the result of the process related to the first main step. This also applies for third and fourth main steps and sub-steps thereof described later. Thus, in the present embodiment, the total number of sub-steps in each of the main steps can vary depending on a processing result of previously executed steps. Then, based on the total number of the sub-steps, the level of advancement and an increment value of the sub-step progress gauge 104 are determined. In the present embodiment, when a state in which a certain step has been completed is defined as "100," an amount obtained by dividing the number of sub-steps with 100 is an increment value (for one step) of the sub-step progress gauge 104.

Regarding the display mode of the sub-step progress gauge 104, an example of displaying in a so-called progress bar format is shown in the example in FIGS. 8 and 9. However, the present disclosure is not limited thereto, and the level of advancement may be indicated as a numerical value in another embodiment. For example, the level of advancement may be displayed in percentage, or may be displayed as "present step number/total step number." For example, when there are a total of 10 sub-steps, the step number may be displayed as "1/10," "2/10," . . . , and "10/10." With this manner of display, which sub-step is currently being processed can be understood easily. Furthermore, a predetermined character string may be displayed at, for example, a position on the left side of the sub-step progress gauge 104, depending on a process of a sub-step. For example, the specific name of a sub-step that is currently being processed may be displayed, or a filename or the like that is being processed may be displayed.

Figure 10:
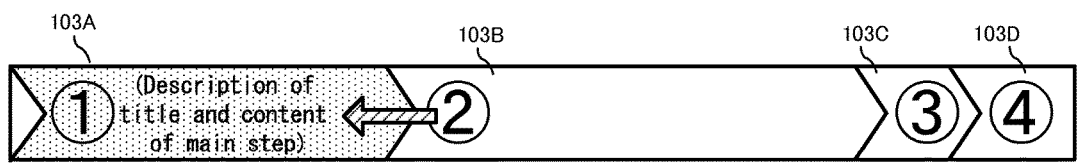
FIG. 10 is a non-limiting example displaying the progress indicator.
Figure 11:
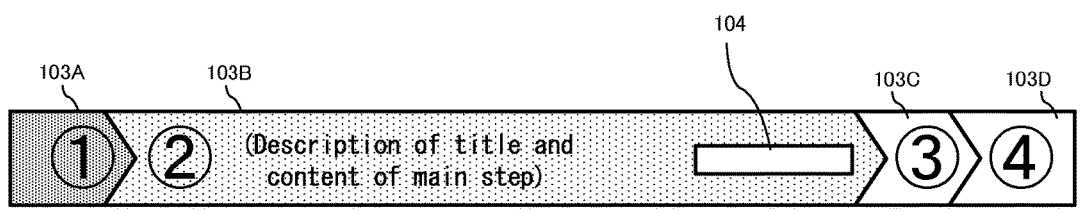
FIG. 11 is a non-limiting example displaying the progress indicator.

When the second main step is initiated, an animation in which the left end of the second main step display area 103B stretches toward the left side of the progress indicator 101 is displayed as shown in FIG. 10 (in other words, the width of the first main step display area 103A related to the first main step whose process has ended is shortened). Then, when the stretching has reached near the left end (a position corresponding to the right end of the first display area), a band in a different color stretches rightward in a manner similar to that for the first main step, ultimately resulting in a state as shown in FIG. 11. In FIG. 11, the first main step display area 103A is displayed at the left end of the progress indicator 101, and, to the immediate right thereof, the second main step display area 103B whose width has been enlarged is displayed. In addition, the sub-step progress gauge 104 is displayed at the right end portion of the second main step display area 103B in a manner similar to that for the first main step. In FIG. 11, the background color of the first main step display area 103A is also changed. This is conducted for visually indicating that the first main step has ended. By conducting such a display, in addition to indicating that the process related to the first main step has ended and that the second main step is currently in progress as the overall progress of the task, the progress of the process related to the second main step itself is also indicated. In other words, main steps that are unprocessed are displayed at the right end side within the progress indicator 101, main steps that have been processed are displayed in a changed background color on the left end side within the progress indicator 101, and a main step that is being executed is displayed with a large width so as to occupy most area within the progress indicator 101.

Figure 12:
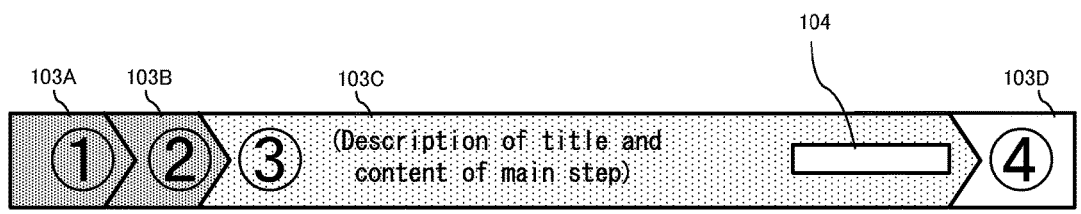
FIG. 12 is a non-limiting example displaying the progress indicator.

As the process related to the second main step advances, the sub-step progress gauge 104 stretches rightward in a manner similar to that for the first main step. The progress gauge reaching the right end means that the second main step has ended. When the second main step ends, a third main step is initiated based on a predetermined operation by the user. Also in this case, in a manner similar to those for the first and second main steps, an animation in which the third main step display area 103C is lengthened (the second main step display area 103B is transformed so as to be shortened simultaneously) is displayed, ultimately resulting in a display state as shown in FIG. 12. More specifically, the first main step display area 103A and the second main step display area 103B are displayed (also in a changed background color) at the left end of the progress indicator 101, and, to the immediate right thereof, the third main step display area 103C whose width is enlarged is displayed. Then, at the right end portion of the third main step display area 103C, the sub-step progress gauge 104 for indicating the progress of the third main step itself is displayed.

Figure 13:
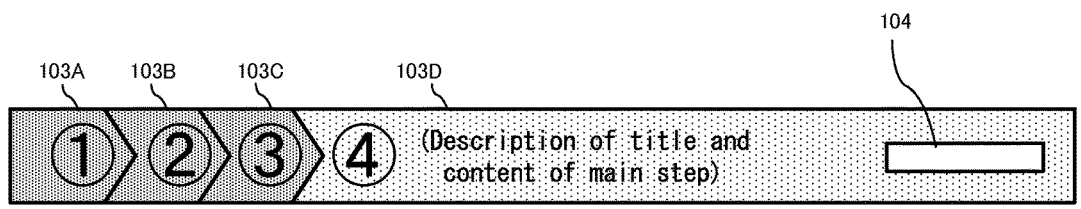
FIG. 13 is a non-limiting example displaying the progress indicator.

When the third main step ends, a fourth main step is initiated based on a predetermined operation by the user. Also similarly in this case, an animation in which the fourth main step display area 103D is transformed is displayed, ultimately resulting in a display state as shown in FIG. 13. More specifically, the first main step display area 103A, the second main step display area 103B, and the third main step display area 103C are displayed (also in a changed background color) at the left end of the progress indicator 101, and, to the immediate right thereof, the fourth main step display area 103D whose width has been lengthened is displayed. At the right end portion of the fourth main step display area 103D, the sub-step progress gauge 104 for indicating the progress of the fourth main step itself is displayed.

As described above, in the present embodiment, the progress status of the overall task is indicated in a display by changing the display position of the main step display area within the progress indicator 101, transforming the respective shapes differently for steps that have been processed, steps that are being processed, and steps that are unprocessed, and changing the display color. In addition, the progress status of the main step itself that is currently being processed is indicated by displaying the sub-step progress gauge 104 within the main step display area for one that is being processed. Thus, the overall progress status of the task, and the (individual) progress status of a step that is currently being processed are displayed using the single progress indicator 101. Since the progress indicator 101 has a horizontally-long belt-like shape and is disposed at the top end of the screen, the two types of progress statuses can be indicated to the user in a space-saving manner. In the present embodiment, although the total number of sub-steps varies depending on the content and result of previous main steps, the sub-step progress gauge 104 is displayed in accordance with the total number, etc., of the sub-steps when each of the main steps is initiated. Thus, an accurate presentation of the degree of progress of the sub-steps included in each of the main steps becomes possible.

Next, as a specific usage example of the progress indicator 101, a process example using the progress indicator 101 for a data transfer process of the game apparatus will be described. First, a general outline of the data transfer process will be described. This process is a process in which data is transferred between two stationary game apparatuses. In the game apparatus envisioned in the present embodiment, the user can install predetermined games and applications via a network or the like. In addition, saved data for the game and the like can be stored. The process is for transferring such a game that has been installed, saved data, and user account data, etc., from a certain game apparatus to another game apparatus. In the present embodiment, when transferring the data, translocation of data is conducted using, for example, a storage medium such as a memory card.

In the data transfer process (corresponding to the task), there are largely four main steps described next:
(1) a step of "preparing;"
(2) a step of "presenting a description regarding a transfer process to a user;"
(3) a step of "exporting data from a transfer source;" and
(4) a step of "importing data into a transfer destination."

(1) In the step of "preparing," a process of displaying some warnings regarding a transfer process overall on a screen of each game apparatus, a process of connecting game apparatuses among themselves via a network, and transmission of data from a transfer destination game machine to a transfer source game machine for indicating a current status of the transfer destination game machine are executed (in the present embodiment, the game apparatuses are connected using a wireless network). As a main operation of the user in this step, the user conducts an operation of reading the warnings displayed on the screen, and turning pages by pushing, for example, a "next" button. In other words, the steps advance with an operation by the user. Furthermore, a single screen represents a single page, and this single page corresponds to a single "sub-step." For example, when the number of pages of the description is five pages, there will be five sub-steps. In this case, the gauge of the sub-step progress gauge 104 increases by one-fifth associated with a single turning of the pages.

(2) In the step of "presenting a description regarding a transfer process to a user," the description of the procedure of the transfer process and warnings related to transfer are presented to the user on a transfer source game apparatus, and a process of obtaining an approval of the user regarding execution of the transfer process is executed (during this time, a transfer destination game apparatus is basically set in a standby state). The warnings presented here are different from those in the step of "preparing," and are warnings based on the individual status of the game apparatus. A main operation of the user in this step is an operation of reading the description displayed on the screen, and turning to the next page by pushing, for example, a "next" button. In some cases, an operation in which the user selects data to be transferred, etc., is included. At the end of this step, since a screen for obtaining the approval regarding the execution of the transfer process is shown, an operation of giving the approval is also to be conducted. It should be noted that the total number of description screens displayed at this step, i.e., the number of description pages (total number of sub-steps), varies depending on the state of the game apparatus. One example of varying factors is the number of games that are installed, and such number varies depending on the individual status of the game apparatus that executes the data transfer process. In addition, in the present embodiment, among games that can be installed, there are "non-transferable" games. Depending on whether or not such a game is installed, the number of description pages varies. More specifically, if such a game is installed, a page showing that transfer cannot be conducted is displayed, whereas if such a game is not installed, such a page will not be displayed, and the total number of pages that should be displayed decreases accordingly.

(3) In the step of "exporting data from a transfer source," a process of exporting data to a memory card is performed mainly in the transfer source game machine. The main operation for the user at this step is conducting an operation of inserting/removing the memory card with respect to the transfer source game apparatus in accordance with an instruction on the screen. At this step, a data export process corresponds to a sub-step. For example, the number of data that should be exported corresponds to the total number of sub-steps in this step. In another embodiment, the operation of inserting/removing the memory card may be included in the sub-step. In addition, the whole data export process may be treated as a single sub-step. More specifically, "inserting/removing a memory card" and "exporting data" may be treated as two sub-steps.

(4) In the step of "importing data into a transfer destination," a process of importing data into the transfer destination game machine from the memory card is performed mainly in the transfer destination game machine. The main operation for the user at this step is conducting an operation of inserting/removing the memory card with respect to the transfer destination game apparatus in accordance with an instruction on the screen. At this step, a data import process corresponds to a sub-step. For example, the number of data that should be imported corresponds to the total number of sub-steps in this step. In addition, a process of deleting the data exported to the memory card, and, in the transfer source game machine, a process of initializing the game apparatus itself at the end are conducted. In another embodiment, the operation of inserting/removing the memory card and the initialization of the transfer source may be included in the sub-step. In addition, the data import process may be treated as a single sub-step. More specifically, "inserting/removing a memory card," "initializing a transfer source," and "importing data" may be treated as three sub-steps.

Figure 14:
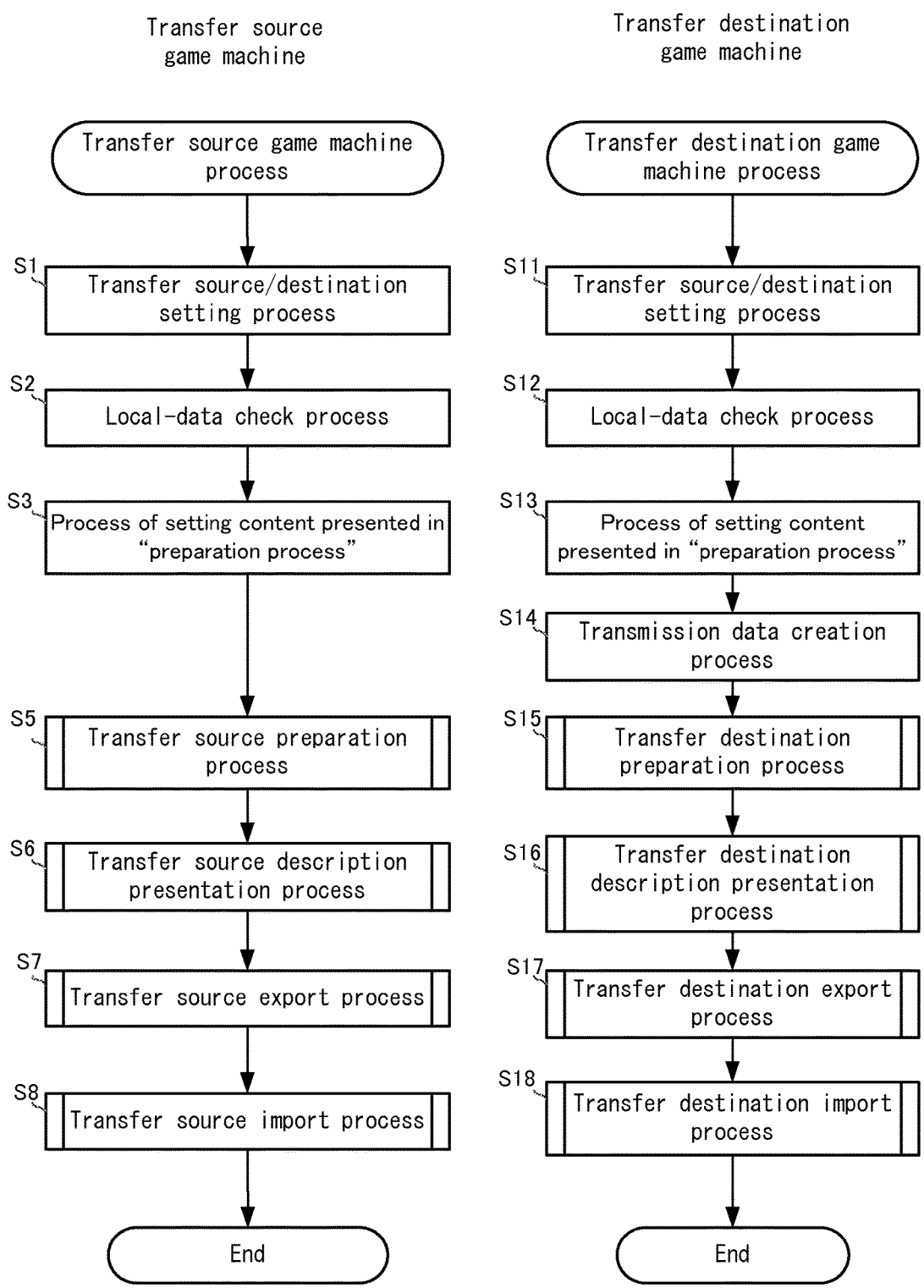
FIG. 14 is a non-limiting example flowchart of a data transfer process according to the present embodiment.

In the following, flows of specific processes in the data transfer process will be described using FIGS. 14 to 18. First, in each of the two game apparatuses, an application for data transfer (hereinafter, referred to as a data transfer application) is started up. When the data transfer application is started up in both game apparatuses, a predetermined screen will be displayed. Here, a screen as shown in FIG. 2 is displayed. Thus, a screen of the initial display state containing the progress indicator 101 is displayed. Then, processes are executed in a flow as shown in FIG. 14. FIG. 14 is a flowchart showing the overall flow of the data transfer process. In FIG. 14, processes for a game apparatus 10 that is the transfer source is shown on the left side, and processes for a game apparatus 10 that is the transfer destination is shown on the right side.

First, a process of determining the "transfer source" and the "transfer destination" is executed based on an operation by the user (steps S1 and S11). In the following description, the game apparatus 10 that is the transfer source is referred to as a "transfer source game machine" and the game apparatus 10 that is the transfer destination is referred to as a "transfer destination game machine."

Next, a local-data check process is executed in both the game apparatuses 10 (steps S2 and S12). This is a process for understanding the current status of each of the game apparatuses. Specifically, this is a process of checking what kind of games are installed, whether or not saved data exists, and whether or not a user account exists, etc.

Next, a process of determining the content (number of description pages, etc.) that is to be displayed in a later described "preparation process" is executed in both the game apparatuses 10 (steps S3 and S13). The determining is conducted based on the result from the local-data check process. Thus, the content that is determined can change depending on the status of each of the game apparatuses 10 regarding installation of games, etc. For example, when some type of game is already installed in the transfer destination game machine, a description explaining that the game will be deleted is added as one content that is to be displayed in the "preparation process." Furthermore, the display order of the content (page) to be displayed is also determined appropriately.

Next, in the transfer destination game machine, creation of data that indicates the current status of the transfer destination game machine and that is to be transmitted to the transfer destination game machine in a process described later is executed (step S14). This is generated based on the result of the local-data check process described above.

Figure 15:
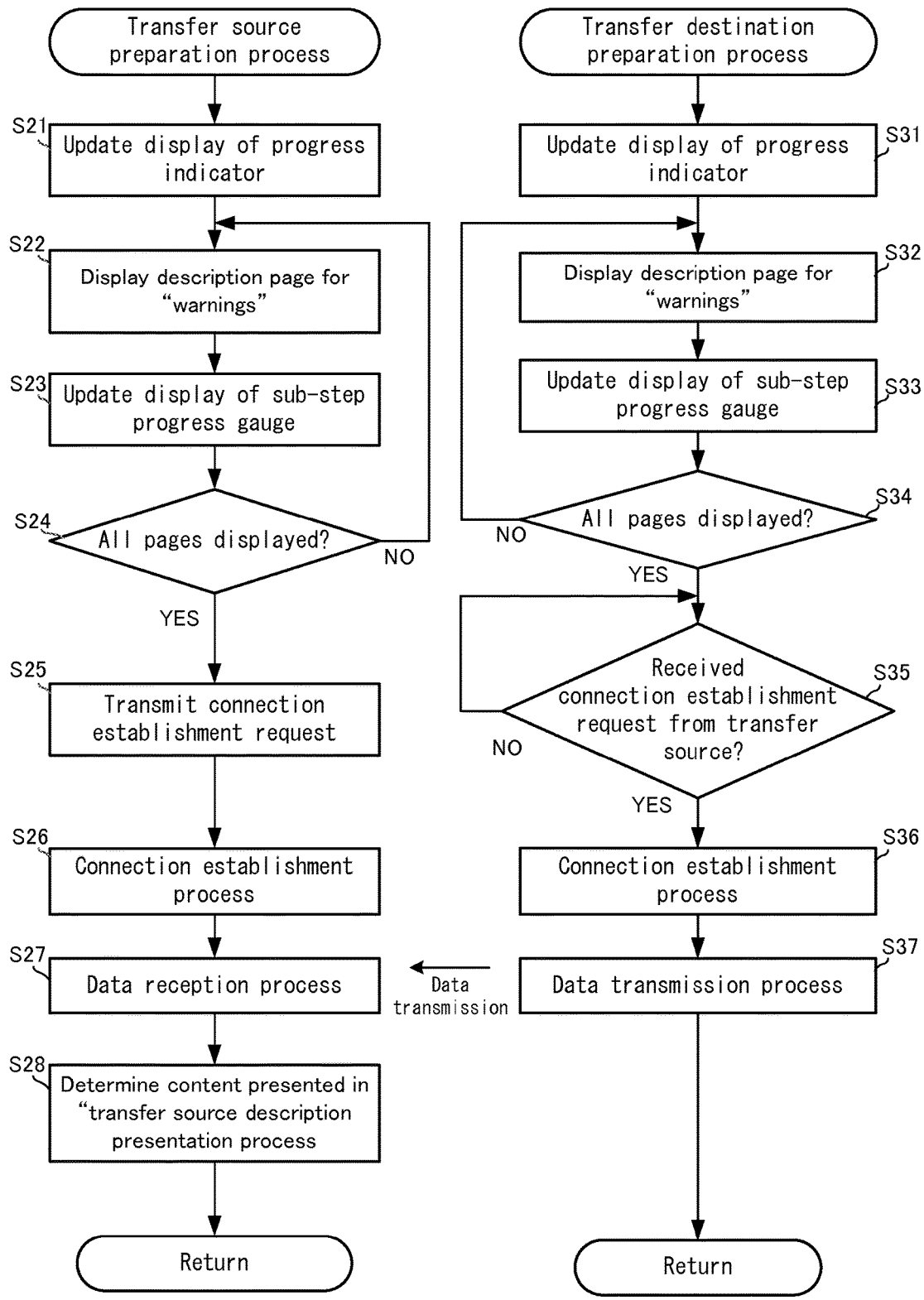
FIG. 15 is a non-limiting example flowchart of a process involved in a "preparation process;"

Next, a process related to the step of "preparing" is executed in each of the game apparatuses 10 (steps S5 and S15). This preparation process corresponds to the first main step. FIG. 15 is a flowchart showing details of the preparation process. In FIG. 15, first, updating of content displayed on the progress indicator 101 is conducted in both of the game apparatuses 10 (steps S21 and S31). Specifically, as shown in FIG. 7, a process of changing to a display mode indicating that the first main step is in progress is executed.

Next, in each of the two game apparatuses, a process of presenting "some warnings regarding a transfer process overall" to the user is executed. More specifically, a process of displaying, on the main process display area 102, the first page among multiple pages that are to be presented to the user as warnings is executed (steps S22 and S32). Next, when an operation of advancing to the next page by the user is received in response to this display, the display of the sub-step progress gauge 104 is updated (steps S23 and S33). For example, when the total number of pages of "some warnings regarding a transfer process overall" that should be presented to the user is ten pages, the sub-step progress gauge 104 is advanced by one-tenth thereof.

Next, it is determined whether or not all pages regarding "some warnings regarding a transfer process overall" have been displayed (steps S24 and S34). As a result, if there is a page that has not been displayed (NO at steps S24 and S34), the flow returns to steps S22 and S33, display of the next page is conducted, and a similar process is repeated. Thus, every time an operation of turning the page is conducted, the sub-step progress gauge 104 is advanced.

On the other hand, if all the pages have been displayed and an operation for advancing the process next is conducted by the user (YES at steps S24 and S34), a process as described next is executed. First, in the transfer source game machine, transmission of a connection establishment request for establishing wireless connection with the transfer destination game machine is conducted (step S25). On the other hand, in the transfer destination game machine, a stand-by process for the connection establishment request is conducted (step S35). When the request is received by the transfer destination game machine (YES at step S35), a connection establishment process is executed between both game apparatuses (steps S26 and S36).

When the connection is established, in the transfer destination game machine, a process of transmitting, to the transfer source game machine, transmission data generated in the process at step S14 is executed (step S37). In addition, in the transfer source game machine, a process of receiving the data is executed (step S27).

Next, in the transfer source game machine, a process of determining a presentation content in a "transfer source description presentation process" described in the following is executed based on the received data and the data obtained at step S2 (step S28). Thus, a process of determining the description content that should be presented to the user is executed in the "transfer source description presentation process" while taking into consideration of the installation status, etc., of the transfer source game machine and the installation status, etc., of the transfer destination game machine. In other words, based on a processing result of the "preparation process" which is the first main step, a process of determining the content for a sub-step in the "transfer source description presentation process" which is the second main step is executed. For example, when the same game title is installed in the transfer source game machine and the transfer destination game machine, a description explaining that saved data in the transfer destination game machine will be overwritten by saved data of the transfer source game machine is added to the presentation content. In addition, for example, in the transfer source game machine, when a "non-transferable" game is installed as described above, a description explaining that is added to the presentation content. Furthermore, for example, when the transfer destination game machine is a model having a smaller storage capacity of the internal storage device 14 than the transfer source game machine and has insufficient storage capacity (free space) to undergo data transfer, a description warning that is added to the presentation content. Still further, for example, when the total number of user accounts registered in both the game apparatuses 10 is larger than a registerable upper limit value, a description explaining that is added to the presentation content. In such a case, a process for having the user select a user account intended for transfer is conducted. (These examples may be considered as examples of varying factors for the number of sub-steps involved in the second main step.)

With this, the processes involved in the preparation process end.

In the example described above, the sub-step progress gauge 104 has been changed in accordance with the operation of reading forward "some warnings regarding a transfer process overall." In another example, the degree of advance of the connection establishment process and a communication process may also be displayed in the sub-step progress gauge 104. For example, in FIG. 15, each of the four steps of step S25 to S28 is considered as a single sub-step. When the total number of pages for "some warnings regarding a transfer process overall" is ten pages (ten sub-steps), the above described four steps may be included, and calculation may be conducted after regarding the total number of sub-steps in the transfer source preparation process as fourteen (this calculation is executed in steps S3 and S13). In addition to the operation of turning a page, the display of the sub-step progress gauge 104 may be updated at a timing when the process of each step of steps S25 to S28 has ended.

Returning to FIG. 14, next, a process related to the step of "presenting a description regarding a transfer process to a user" (hereinafter, referred to as description presentation process) is executed (steps S6 and S16). This description presentation process corresponds to the second main step. Furthermore, this process is mainly displaying of description on the transfer source game machine and an operation in response thereto by the user, and the transfer destination game machine basically enters a standby state.

Figure 16:
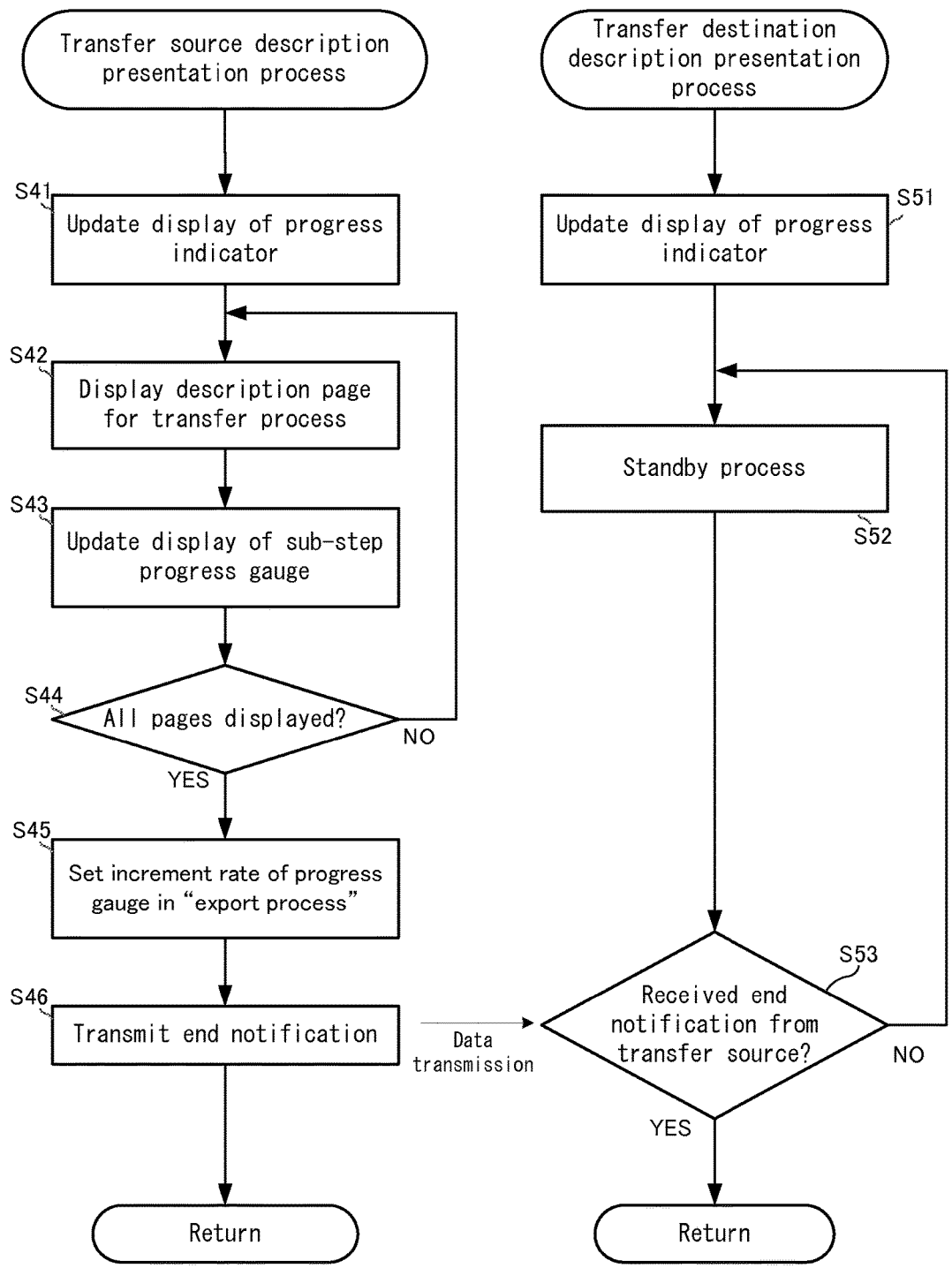
FIG. 16 is a non-limiting example flowchart of a process involved in a "description presentation process;"

FIG. 16 is a flowchart showing details of the description presentation process. First, in both of the game apparatuses, a process of updating the display of the progress indicator 101 is executed (steps S41 and S51). More specifically, a process of changing the progress indicator 101 to a display mode (cf. FIG. 11) indicating that the second main step is in progress is executed.

Next, in the transfer source game machine, a process of displaying a description page regarding the transfer process is executed. As described above, the display order, the total number of pages, and the content of description pages are determined at step S28. A process of displaying the first page among the determined pages on the main process display area 102 is executed (step S42). Next, when an operation for advancing to the next page is received from the user, the display of the sub-step progress gauge 104 is updated (step S43). Then, it is determined whether or not all the description pages that should be displayed have been displayed (step S44). As a result, if there is a page that has not been displayed (NO in the process at step S44), the flow returns to step S42, and a process of displaying a remaining description page is repeated.

In the process of the description presentation, there may be cases where, for example, a process regarding a predetermined inquiry to the user and a process of having the user select data that should be transferred are included. For example, as described above, when the total number of user accounts is larger than the upper limit value for registration, a process of having the user select an account that should be transferred is executed appropriately. Then, the result of this process is temporarily stored in the main memory 15, and used in a later process.

On the other hand, when all the description pages have been displayed (YES at step S44), next, a process of setting an increment rate of the sub-step progress gauge 104 at the step of "export process" described later is executed (step S45). For example, upon conducting the description presentation, when data intended for transfer has been selected by the user, the number, etc., of data to be transferred varies depending on the result. Thus, the increment rate of the sub-step progress gauge 104 is calculated and set based on such selection result, etc. For example, when the number of data sets to be transferred is 100, the increment rate of the gauge is set to 1%. In addition, for example, when the number of data sets to be transferred is 50, the increment rate is set to 2%.

Next, in the transfer source game machine, a notification indicating that the description presentation process has ended is transmitted to the transfer destination game machine (step S46). Then, the description presentation process in the transfer source game machine ends. Here, while the processes of steps S42 to S45 are conducted, a process of standing by (stand-by process) until the end notification is sent is executed in the transfer destination game machine (steps S52 and S53). Then, when the end notification is received by the transfer destination game machine (YES at step S53), the sub-step progress gauge 104 on the transfer destination game machine side is updated to a display indicating completion of the step, and the process in the transfer destination game machine also ends.

In the standby process described above, data for indicating a progress state of a sub-step may be transmitted to the transfer destination game machine at a timing when the display of the sub-step progress gauge 104 in the transfer source game machine is updated (a timing of step S43). In addition, based on this, the display of the sub-step progress gauge 104 on the transfer destination game machine side may be updated. More specifically, the progress status of the sub-steps in the transfer source game machine may also be displayed on the sub-step progress gauge 104 of the transfer destination game machine A similar process may be conducted in the game apparatus entering the standby state also for the remaining main steps described in the following.

Returning to FIG. 14, next, a process related to the step of "exporting data from a transfer source" (hereinafter, referred to as an export process) is executed (steps S7 and S17). This process corresponds to the third main step. Since this process is a process mainly involved in exporting data in the transfer source game machine, the transfer destination game machine basically enters the standby state also during this process.

Figure 17:
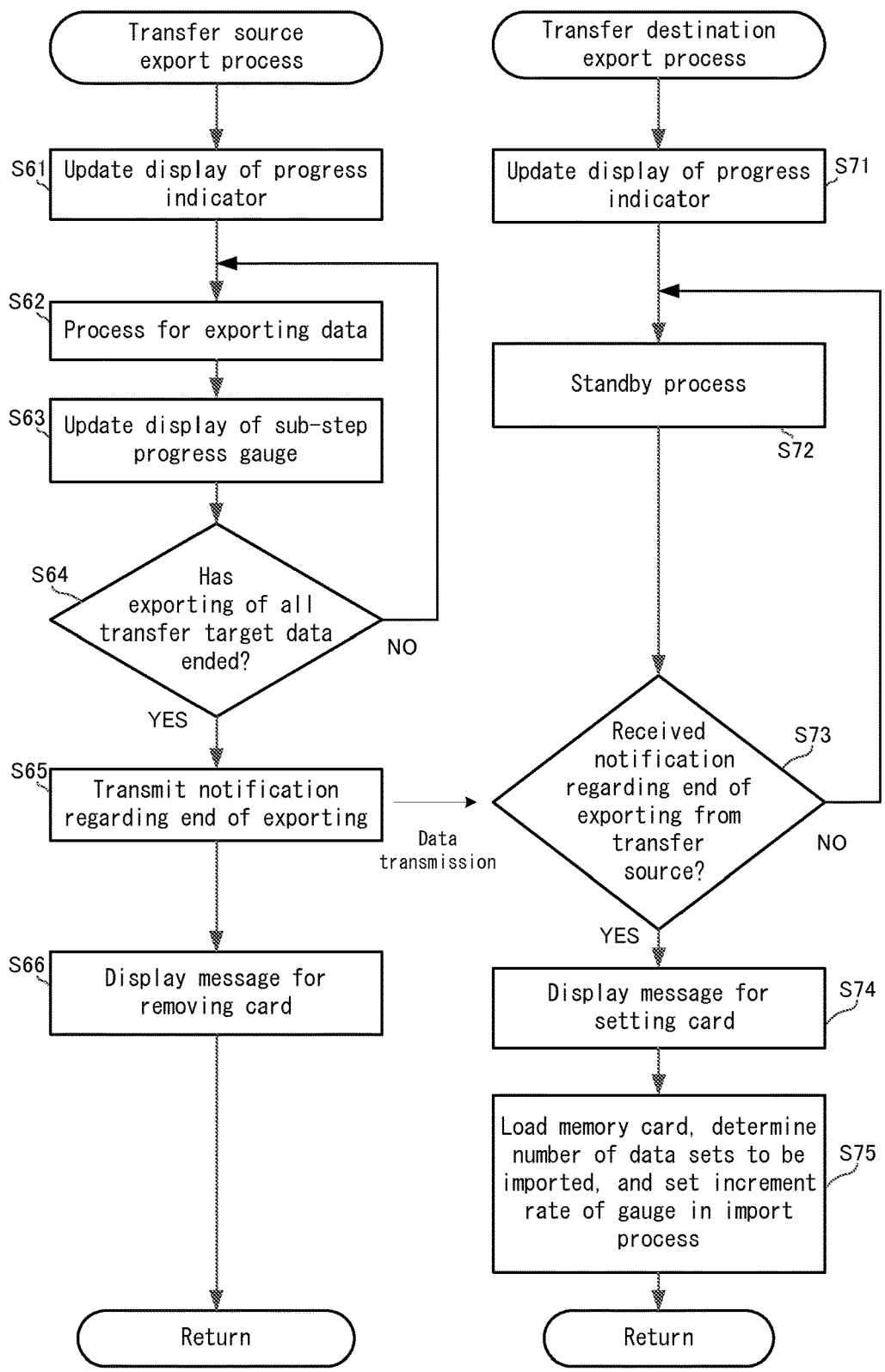
FIG. 17 is a non-limiting example flowchart of a process involved in an "export process;"

FIG. 17 is a flowchart showing details of the export process. First, in both of the game apparatuses, a process of updating the display of the progress indicator 101 is executed (steps S61 and S71). More specifically, a process of changing the progress indicator 101 to a display mode (cf. FIG. 12) indicating that the third main step is in progress is executed.

Next, in the transfer destination game machine, a process of standing by until an end notification described later is received is executed (steps S72 and S73). On the other hand, in the transfer source game machine, a process of exporting the data to be transferred is executed. Specifically, a message for having the user set the memory card is displayed appropriately on the main process display area 102. When the memory card is set, a process of exporting the transfer target data to the memory card is executed (step S62). Furthermore, a process of updating the display of the sub-step progress gauge 104 is executed in accordance with the progress of the exporting (step S63). For example, when the number of data sets to be transferred is 100, the flow moves to the process at step S63 every time a single data set is exported. In addition, as the increment rate of the gauge, the increment rate determined at step S45 is used.

Next, it is determined whether or not exporting of all the transfer target data has ended (step S64). If the exporting has not ended (NO at step S64), the flow returns to step S62 and the process is repeated. If the exporting has ended (YES at step S64), next, a notification indicating that the export process has ended is transmitted from the transfer source game machine to the transfer destination game machine (step S65). Then, a process of displaying, on the main process display area 102, a message prompting the user to remove the memory card from the transfer source game machine and insert that in transfer destination game machine is executed (step S66). Then, when an operation by the user for advancing to the next process is conducted in response to this display, the export process in the transfer source game machine ends.

On the other hand, when the notification indicating that the export process has ended is received by the transfer destination game machine (YES at step S73), the message prompting the user to remove the memory card from the transfer source game machine and insert that in the transfer destination game machine is also displayed on the main process display area 102 of the transfer destination game machine (step S66). When the memory card is set, the card is loaded and a process of calculating the number of data sets to be imported is executed in the transfer destination game machine. Then, based on the number of data sets, a process of setting the increment rate of the sub-step progress gauge 104 in the export process describe next is executed (step S67). With this, the export process in the transfer destination game machine also ends.

Returning to FIG. 14, next, a process related to the step of "importing data into a transfer destination" (hereinafter, referred to as export process) is executed (steps S8 and S18). This process corresponds to the fourth main step. Since this process is mainly a process of importing data in the transfer destination game machine, the transfer source game machine basically enters the standby state during this process.

Figure 18:
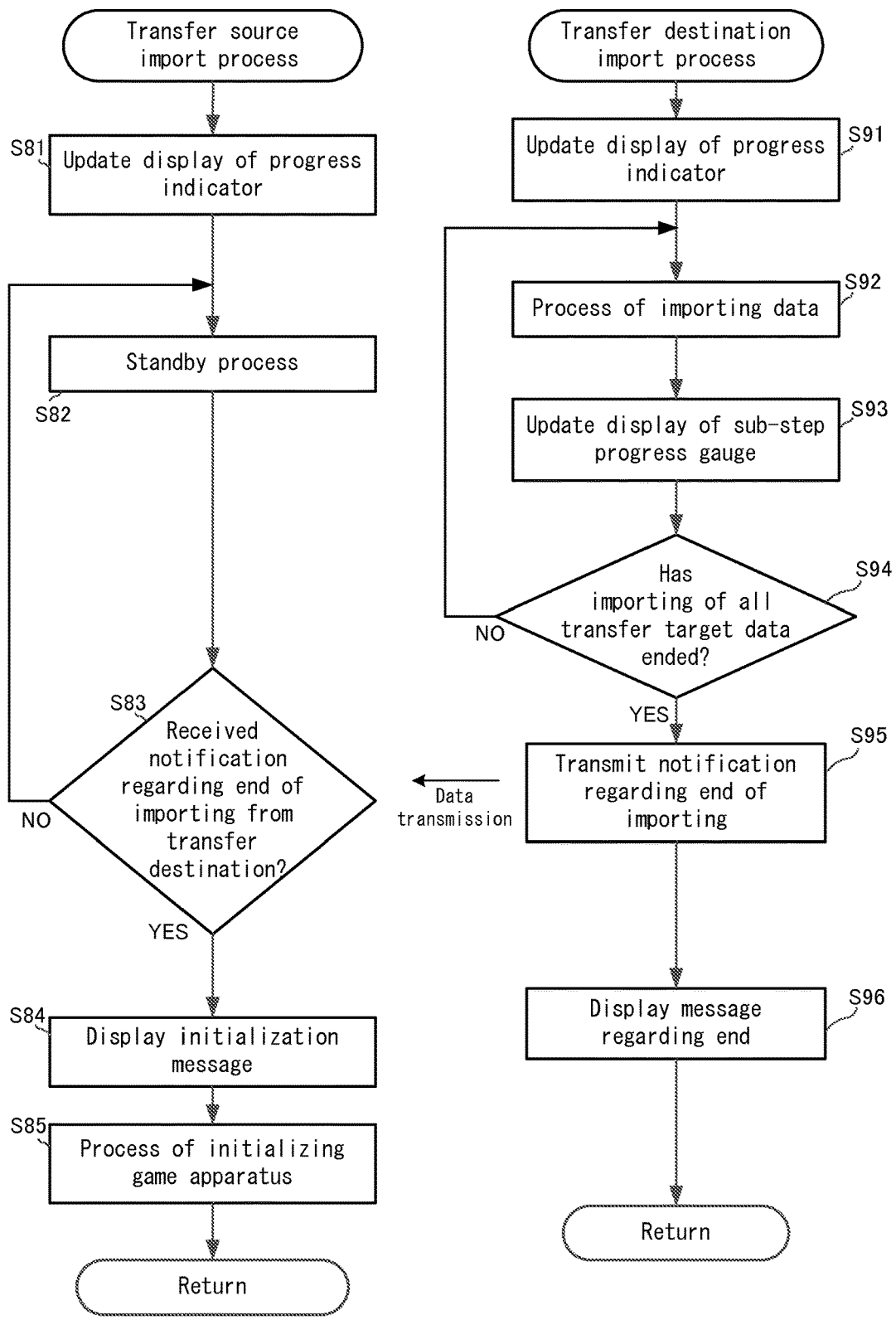
FIG. 18 is a non-limiting example flowchart of a process involved in an "import process;"

FIG. 18 is a flowchart showing details of the import process. First, in both of the game apparatuses, a process of updating the display of the progress indicator 101 is executed (steps S81 and S91). More specifically, a process of changing the progress indicator 101 to a display mode (cf. FIG. 13) indicating that the fourth main step is in progress is executed.

Next, in the transfer source game machine, a process of standing by until an end notification described later is received is executed (steps S82 and S83). On the other hand, in the transfer destination game machine, a process of importing the data to be transferred is executed. Specifically, a process of importing the data exported from the memory card into the internal storage device 14 of the transfer destination game machine is executed (step S92). Furthermore, a process of updating the display of the sub-step progress gauge 104 is executed in accordance with the progress of the importing (step S93). For example, when the number of data sets to be transferred is 100, the flow moves to the process at step S93 every time a single data set is imported. In addition, as the increment rate of the gauge, the increment rate determined at step S67 is used.

Next, it is determined whether or not importing of all the transfer target data has ended (step S94). If the importing has not ended (NO at step S94), the flow returns to step S92 and the process is repeated. If the importing has ended (YES at step S94), next, a notification indicating that the import process has ended is transmitted from the transfer destination game machine to the transfer source game machine (step S95). Then, messages prompting the user to remove the memory card from the transfer destination game machine and indicating that the importing has ended are displayed on the main process display area 102 (step S96). With this, the export process in the transfer destination game machine ends. After the importing of the transfer data has ended, a process of deleting the data on the memory card may be executed.

On the other hand, when the notification indicating that the import process has ended is received by the transfer source game machine (YES at step S83), the sub-step progress gauge 104 of the transfer source game machine is updated to a display state indicating completion. In addition, a message indicating that the transfer source game machine itself will be initialized is displayed on the main process display area 102 (step S84). When a predetermined operation in response to the message is received from the user, a process of initializing the transfer source game machine itself is executed. When the initializing ends, the import process in the transfer source game machine also ends.

As described above, in the present embodiment, the overall progress status of the task (how far the main steps have been processed currently), and the progress status of a main step that is being executed, are displayed using the single horizontally-long belt-shaped progress indicator 101. With this, the two types of progress statuses can be presented to the user while saving display space on a display screen. In addition, in cases where the content (step number) of sub-steps varies depending on processes in previous steps, the progress of the sub-steps can be presented more accurately.

In the embodiment described above, an example has been described in which, as a display mode of the progress indicator 101, the main step display area 103 is transformed and the display position thereof is changed. In addition an example has been described in which the progress indicator 101 is shaped in a horizontally-long and belt-like shape. However, the present disclosure is not limited thereto, and a display mode as described next may be used in another embodiment. For example, the progress indicator 101 may have a vertically-long belt-shape. In this case, the progress indicator 101 may be disposed at the right end or left end of the screen.

Furthermore, in the example described above, whether it is a step that is currently being processed or a step that has been processed is indicated through a transformation of increasing the width of the main step display area 103 that is being processed and reducing the width after the process ends. However, the present disclosure is not limited thereto, and, in another embodiment, as long as a step that is being processed is identifiable, the shape, size, and color of the main step display area 103 that is being processed may be displayed so as to be different from those of other main step display areas 103.

Furthermore, for the display of the progress status of a sub-step, the sub-step progress gauge 104 is used in the example described above. Alternatively, although expansion of the main step display area that is being processed is conduced similarly to the expansion in the example described above, the color can be set to not change immediately in another embodiment. This is because expansion of the display area alone enables identifying which main step is being processed. Regarding the utilization of different colors, a display mode may be used in which a band in a different color stretches from the left end of a main step display area that is currently being processed toward the right, depending on the progress of a sub-step. Thus, a display mode may be used in which the whole region of the expanded main step display area is treated as in the case with the sub-step progress gauge 104 (in this case, display of the sub-step progress gauge 104 at the right end will not be conducted as described above).

Figure 19:
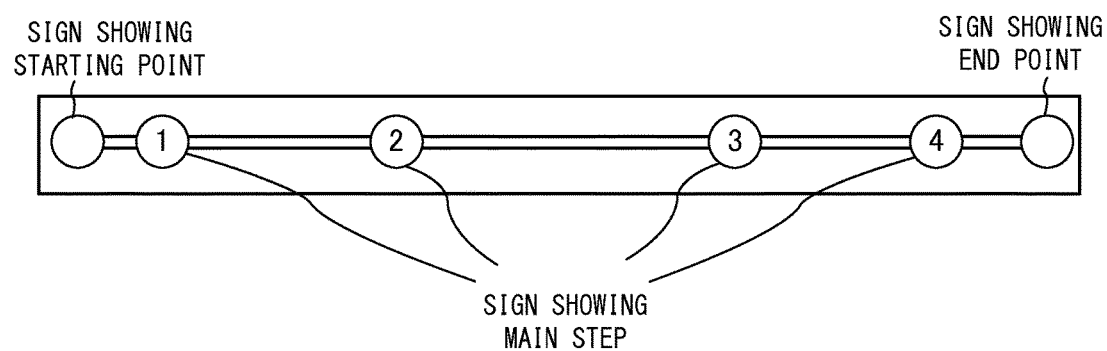
FIG. 19 is another non-limiting example of the progress indicator.
Figure 20:
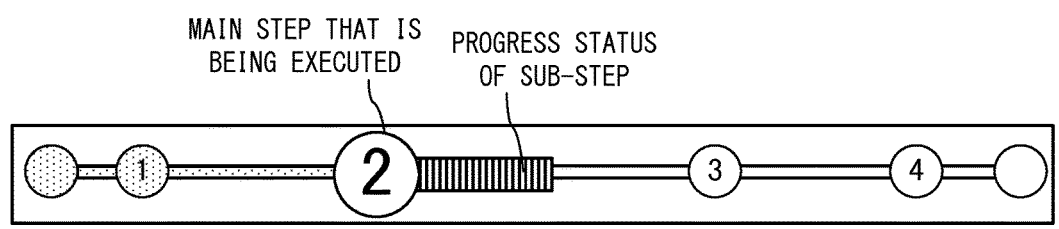
FIG. 20 is another non-limiting example of the progress indicator.

Furthermore, for example, the position of the main step display area 103 may be fixed. As one example, a display as described above next may be used. In a horizontally-long belt-shaped progress indicator, the horizontal axis thereof represents the overall progress. A sign showing a starting point of the overall steps is disposed at the left end of the indicator, and a sign showing the end point of the overall steps is disposed at the right end. In between the two signs, signs each showing a main step are disposed in the horizontal direction with a predetermined interval (cf. FIG. 19). Then, regarding a progress status of a main step that is being executed, an animation may be displayed in which a predetermined line (progress bar, etc.) extends from a sign showing a main step that is being executed toward a sign of the next main step (i.e., a sign located to the immediate right) (cf. FIG. 20). Thus, a segment between a sign of a certain main step to a sign of the next main step corresponds to the main step display area, and the predetermined line displayed on this segment corresponds to the sub-step progress gauge 104. In this case, since the number of sub-steps involved in a main step is already calculated when the main step starts, the length (stretch rate) of the line corresponding to a single sub-step may be determined based on this number. More specifically, the length of the line is divided by the number of sub-steps, and each extension may be conducted by a single divided portion of the length. Furthermore, a sign of a main step that is being executed may be displayed larger than other signs. Still further, the arrangement interval of the signs representing the main steps may be set to equal intervals, or the size of the interval may be determined in accordance with the number of sub-steps or the time required for each of the main steps. For example, a main step that requires more time than other steps may have a larger interval from the next main step, etc. When the number of sub-steps is fixed (when the number of steps is known in advance), the arrangement interval may be set in accordance with the number.

In the above described embodiment, an example has been described in which the progress display of the sub-step progress gauge 104 advanced basically in response to an operation by the user (an operation of turning a page). Alternatively, the process may advance automatically without an operation by the user. Then, the progress level may be calculated and displayed in real time based on data volume, etc. For example, envisioning a case where a process of downloading predetermined data from a predetermined server exists in a sub-step, the progress level may be calculated and displayed based on the reception speed, the size of data to be downloaded, and the size of data that has been received, etc.

Furthermore, the process related to the progress indicator 101 as described above is not limit to the data transfer process described above, and is applicable to other informational processes. For example, the above described process is applicable to a series of process steps from selection to payment for a product on an on-line shop. In this case, it is conceivable that the number of sub-steps described above may vary depending on the number of purchased products and the payment system. Alternatively, for example, when a tutorial of a game is to be presented to the user, the process is applicable to such tutorial presentation process. In this case, for example, on the occasion of displaying a tutorial display of a certain game, when there is so-called "sequel" to the game, it is conceivable that a presentation content of the tutorial may vary depending on whether or not a user has experienced playing the previous work. Alternatively, for example, the process of the above described embodiment is also applicable of a process of presenting an on-line manual, a process involved in an initial-setting operation of a game apparatus, and the like.

In the embodiment described above, although the processes involved in displaying the progress indicator 101 are executed in a single information processing apparatus (the transfer source game machine or the transfer destination game machine), in another embodiment, these multiple processes may be distributed and executed on multiple information processing apparatuses. Furthermore, the multiple processes described above may be executed on a single computer (processor 13) or may be distributed and executed on multiple computers. Still further, these multiple processes may be partially or entirely achieve by a dedicated circuit.

Although an example has been described using a stationary game system in the embodiment described above, the present disclosure is not limited thereto, and is also applicable to portable game apparatuses, and other personal digital assistants, tablet terminals, and personal computers, etc.

What is claimed is:
1. A computer-readable non-transitory storage medium having stored thereon an information processing program which, when executed by a computer of an information processing apparatus, causes the information processing apparatus to perform operations comprising:

displaying, on a display screen, a progress indicator including within it an overall progress display area configured to indicate an overall progress status of the task, and an individual progress display area configured to indicate an individual progress status of each of multiple steps included in the task, the individual progress display area being displayed inside the overall progress display area.

2. The non-transitory computer-readable storage medium according to claim 1, wherein the progress indicator is configured to display a progress status using a gauge that lengthens depending on a progress.

3. The non-transitory computer-readable storage medium according to claim 1, wherein the progress indicator is configured to indicate, in an identifiable manner on the overall progress display area, which step is being processed among the multiple steps included in the task, and indicate, in an identifiable manner on the individual progress display area, which sub-step is being processed among multiple sub-steps included in the step that is being processed.

4. The non-transitory computer-readable storage medium according to claim 1, wherein the progress indicator is configured to display the overall progress display area such that the overall progress display area is divided for each of the multiple steps included in the task.

5. The non-transitory computer-readable storage medium according to claim 4, wherein the progress indicator is further configured to display the individual progress display area inside an area related to a step that is being processed within the divided overall progress display area.

6. The non-transitory computer-readable storage medium according to claim 4, wherein the progress indicator is further configured to display, within the divided overall progress display area, an area related to a step that is being processed such that at least one of shape, size, and color of the area is different from an area related to other steps.

7. The non-transitory computer-readable storage medium according to claim 6, wherein the progress indicator is configured to transform and display an overall progress display area related to a step that is being processed so as to be lengthened or expanded, and transform and display the overall progress display area so as to be shortened or contracted when the step ends.

8. The non-transitory computer-readable storage medium according to claim 7, wherein the progress indicator is configured to display the individual progress display area inside the lengthened or expanded overall progress display area.

9. The non-transitory computer-readable storage medium according to claim 1, wherein the progress indicator is configured to indicate, in the overall progress display area, a total number of steps included in the task.

10. The non-transitory computer-readable storage medium according to claim 1, wherein the progress indicator is configured to display, in a distinguishable manner, an overall display area related to a processed step and an overall display area related to an unprocessed step.

11. The non-transitory computer-readable storage medium according to claim 1, wherein the progress indicator is configured to change a display position of the individual progress display area within the progress indicator depending on which step is being processed among the multiple steps included in the task.

12. An information processing apparatus that indicates a progress status of a task which includes a series of multiple steps, the information processing apparatus comprising at least one processor configured to:

display, at a predetermined display part, a progress indicator, the progress indicator including within it an overall progress display area configured to indicate an overall progress status of the task, and an individual progress display area configured to indicate an individual progress status of the multiple steps included in the task, and the individual progress display area being displayed inside the overall progress display area.

13. An information processing system configured to indicate a progress status of a task which includes a series of multiple steps, the information processing system comprising:

a display screen; and at least one processor configured to:

display, on the display screen, a progress indicator, the progress indicator including within it an overall progress display area configured to indicate an overall progress status of the task, and an individual progress display area configured to indicate an individual progress status of the multiple steps included in the task, and the individual progress display area being displayed inside the overall progress display area.

14. An information processing method for controlling an information processing apparatus or an information processing system configured to indicate a progress status of a task which includes a series of multiple steps, the method comprising displaying, at a predetermined display part, a progress indicator, the progress indicator including within it an overall progress display area configured to indicate an overall progress status of the task, and an individual progress display area configured to indicate an individual progress status of the multiple steps included in the task, the individual progress display area being displayed inside the overall progress display area.

\* \* \* \* \*